March 18, 1952     C. E. DOUGHERTY ET AL     2,589,998
ELECTRONIC CONTROL FOR MONORAIL HOISTS OR THE LIKE
Filed July 11, 1946     5 Sheets-Sheet 1

Inventors
Edward E. Minor
Charles E. Dougherty
By Bernard F. Darwey
Attorney

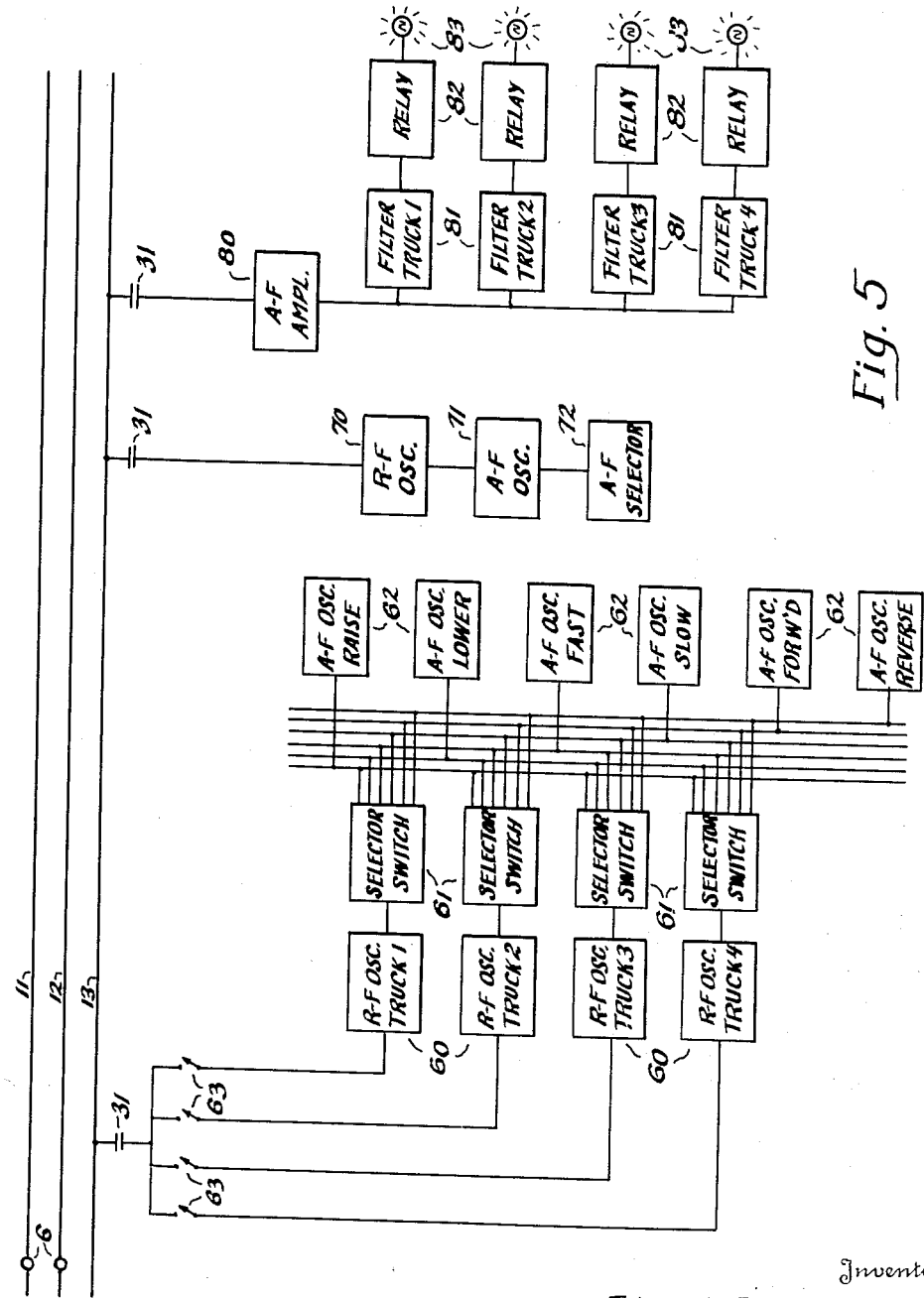

March 18, 1952  C. E. DOUGHERTY ET AL  2,589,998
ELECTRONIC CONTROL FOR MONORAIL HOISTS OR THE LIKE
Filed July 11, 1946  5 Sheets-Sheet 5
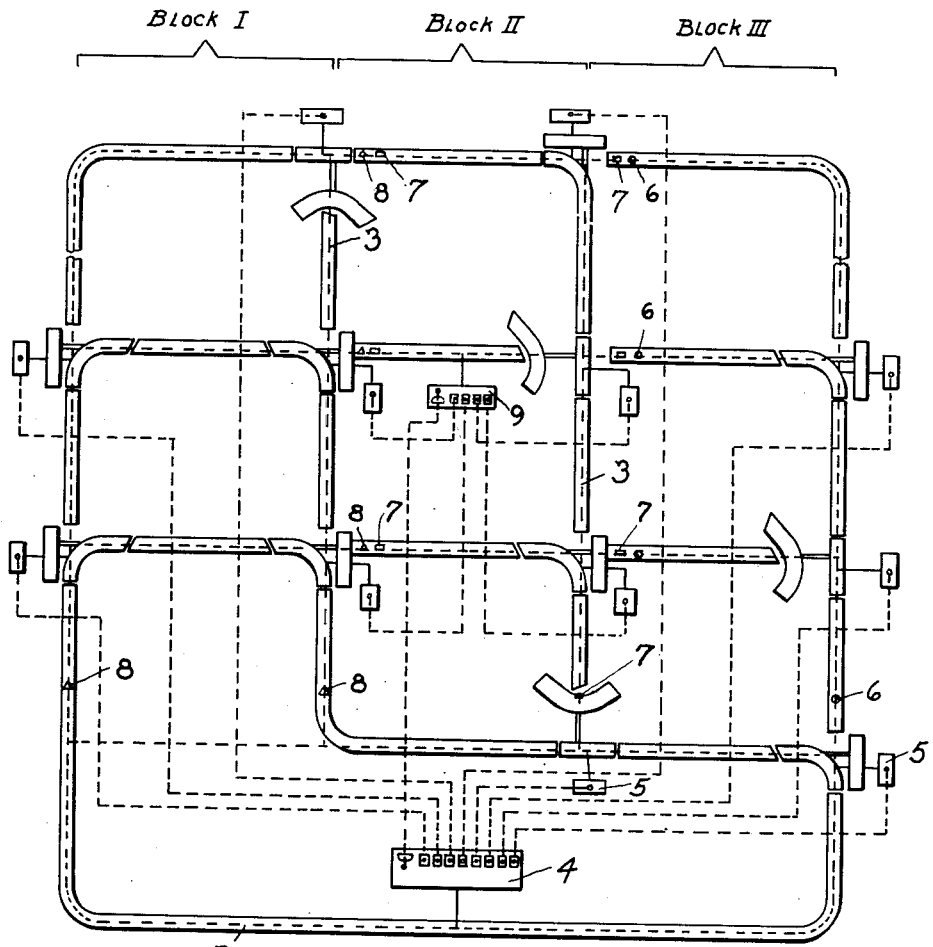
*Fig. 7*
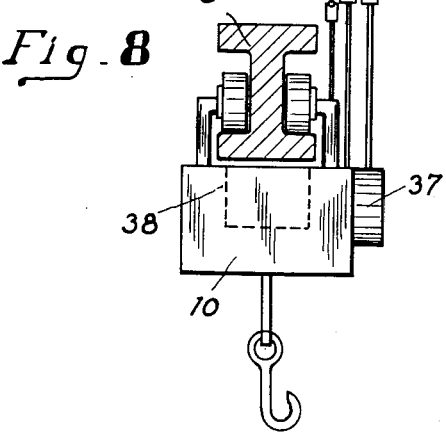
*Fig. 8*
INVENTORS
CHARLES E. DOUGHERTY
EDWARD E. MINOR
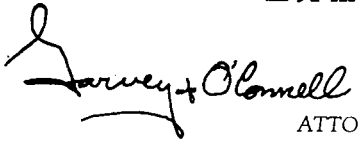
ATTORNEYS Patented Mar. 18, 1952

2,589,998

UNITED STATES PATENT OFFICE 2,589,998

ELECTRONIC CONTROL FOR MONORAIL HOISTS OR THE LIKE

Charles E. Dougherty, New York, N. Y., and Edward E. Minor, Baltimore, Md.

Application July 11, 1946, Serial No. 682,975

10 Claims. (Cl. 104—149)

This invention is an electronic control for electric-motor-driven traveling hoists or the like, and more particularly, an electronic control utilizing the power wires to convey high-frequency control signals from a control station to wherever the driving motors may be located along the power line.

Cargo hoist trucks which travel along an overhead monorail and obtain electric power from parallel-running trolley wires have been controlled by electric switches hanging from the trucks or by the use of extra trolley wires carrying control currents. It is desirable to be able to control several cargo trucks on such a monorail system, for example, from a central control station without the use of extra trolley wires for control purposes, and this is one of the objects of the invention.

Another object of this invention is to provide means for causing moving cargo trucks to stop in any one of several pre-determined block areas in the monorail system without the use of extra control wires.

A further object of this invention is to provide means for controlling cargo trucks in any local block area by either a central control station or a local block control station without the use of extra control wires.

A further object of this invention is to provide a monorail control system utilizing the power line to convey control signals and yet not being affected by fluctuations of the electric power on the power line.

These and other objects of the invention may be more clearly understood by reference to the accompanying drawings illustrating one of many possible embodiments of the invention, in which:

Figure 5 shows diagrammatically the component parts of the control system of the embodiment of this invention which are located at a central control station on the line.

Figure 7 is a view similar to Figure 1 but illustrating more clearly the relation of the various parts of the monorail conveyor system on a dock.

Figure 8 is a cross-section of a monorail and an end view of an electrically controlled monorail cargo truck.

Figure 1:
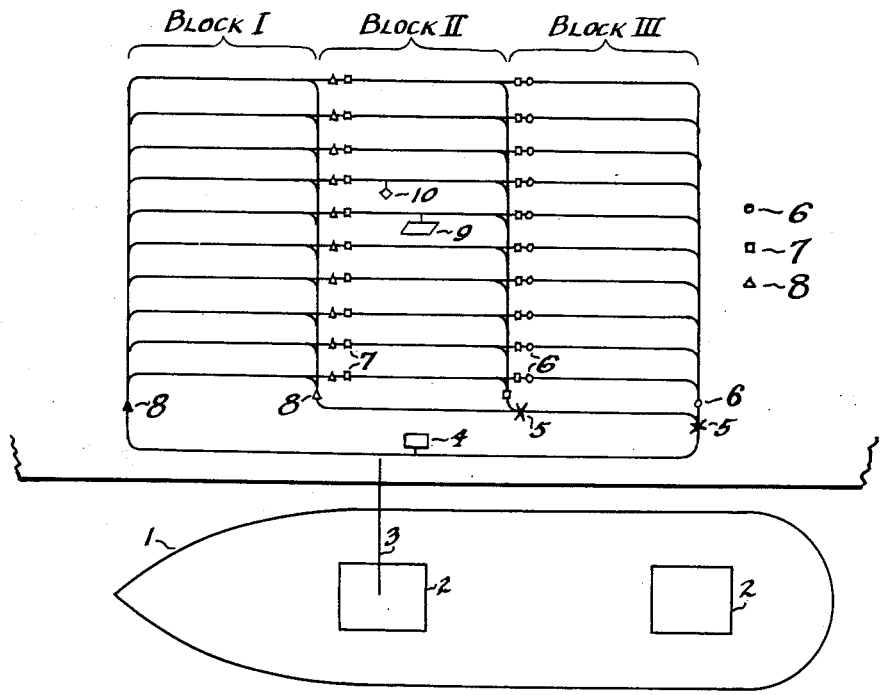
Figure 1 is a representation of a monorail conveyor system on a dock onto which cargo is unloaded from a ship.

Now, referring to the figures for a more detailed explanation of one of many specific embodiments which fall within the scope of the invention;

Referring to Figure 1, ship 1 is at an unloading dock having a monorail network for transporting the cargo from the ship to any place on the dock area. Cargo is lifted from hatch 2 by traversing hoist on track 3 and transported to the dock where the cargo is transferred to another traversing hoist on the monorail network on the dock. Figures 1, 7 and 8 indicate the location of the monorail track and associated power trolley line from which the cargo trucks obtain motive power.

Manually-operated or electrically-operated track switches such as suggested in Figure 7 control the course of a cargo truck which is travelling along the monorail. At points 5 electrically-operated track switches are located which can be controlled from central control station 4. Cargo trucks going in a counter-clockwise direction from the dock side can be directed to block III or block II or block I by the appropriate positioning of track switches at points 5.

Central control station 4 generates modulated radio-frequency signals and applies them to a power trolley wire. Cargo truck 10 has run and hoist motors which obtain motive power by means of a trolley from the trolley wires. Cargo truck 10 also has a receiver connected to the trolley so that it can receive signals through the trolley wire from central control station 4 regardless of where on the monorail system the cargo truck happens to be (see Figure 8).

Filters 6 on another wire of the trolley line allow power to pass but act to trap currents of certain frequencies within block III. Filters 7 and filters 8 have like effect within blocks II and I, respectively. Local control 9 can be connected to another trolley wire anywhere within the block and control cargo trucks within the block, because of the use of radio-frequencies which are isolated by the filters isolating the block.

In operation, the operator at central control station 4 sends a cargo truck 10 into the appropriate block for unloading. When the cargo truck reaches the selected block, it is stopped by means to be subsequently explained, and control is automatically transferred to local control 9 near the point where the cargo is to be deposited. In the deposit area, monorail track switches are set by hand to direct the cargo truck to the appropriate rail. Local control 9 operator causes the cargo truck to travel along the rail to the point of deposit and then causes the cargo to be lowered into position. Local control 9 operator then signals central control station 4 operator who causes the cargo truck to return for another load from the ship.

It is to be understood that Figures 1 and 7 show a highly simplified version of a monorail system for ease of explanation. Switches 5 which are shown as controlled electrically by the central control station 4 can be dispensed with by having the central control station control cargo trucks moving in a loop through all blocks. Then when a cargo truck enters a block in which the central control station operator has selected as a destination of the cargo truck, the cargo truck will be caused to automatically stop by means of block equipment to be subsequently described.

Figure 2:
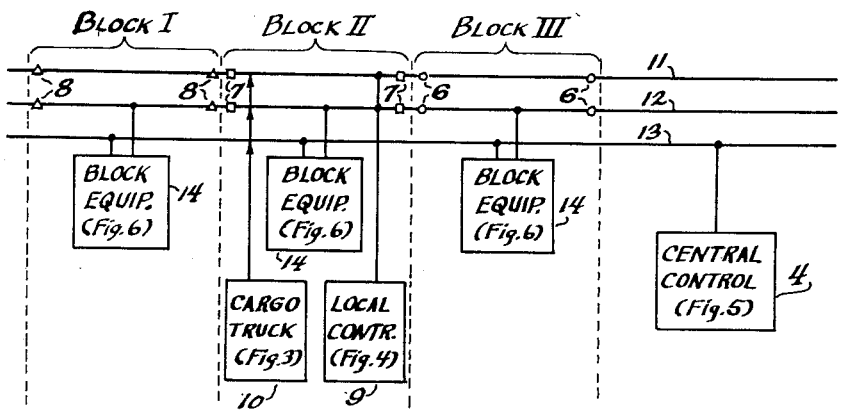
Figure 2 shows diagrammatically the units of the control system of the embodiment of this invention in relation to a three-phase trolley power line of a monorail conveyor system.

Figure 2 is a diagrammatic representation of the components of the control equipment in relation to each other and to the trolley line. The trolley line is shown having three wires such as are used with cargo trucks having three-phase electric hoist and run motors (see Figure 8). Blocks III, II and I are shown isolated by filters 6, 7 and 8, respectively. The radio-frequency signals from central control 4 are sent along trolley wire 13 to wherever cargo truck 19 is along the line. Central control 4 also sends a signal along wire 13 to selected block equipment 14 which then returns a different signal to wire 12 which latter signal is trapped within the block. When a cargo truck reaches the block selected, the signal from block equipment 14 is received by the cargo truck receiver which in turn causes the cargo truck to stop and causes control of the cargo truck to be automatically transferred from the central control station to the local control in the block. When the local control operator has unloaded the cargo truck, he sends a signal to the cargo truck that causes control of the cargo truck to be returned to the central control station.

Figure 3:
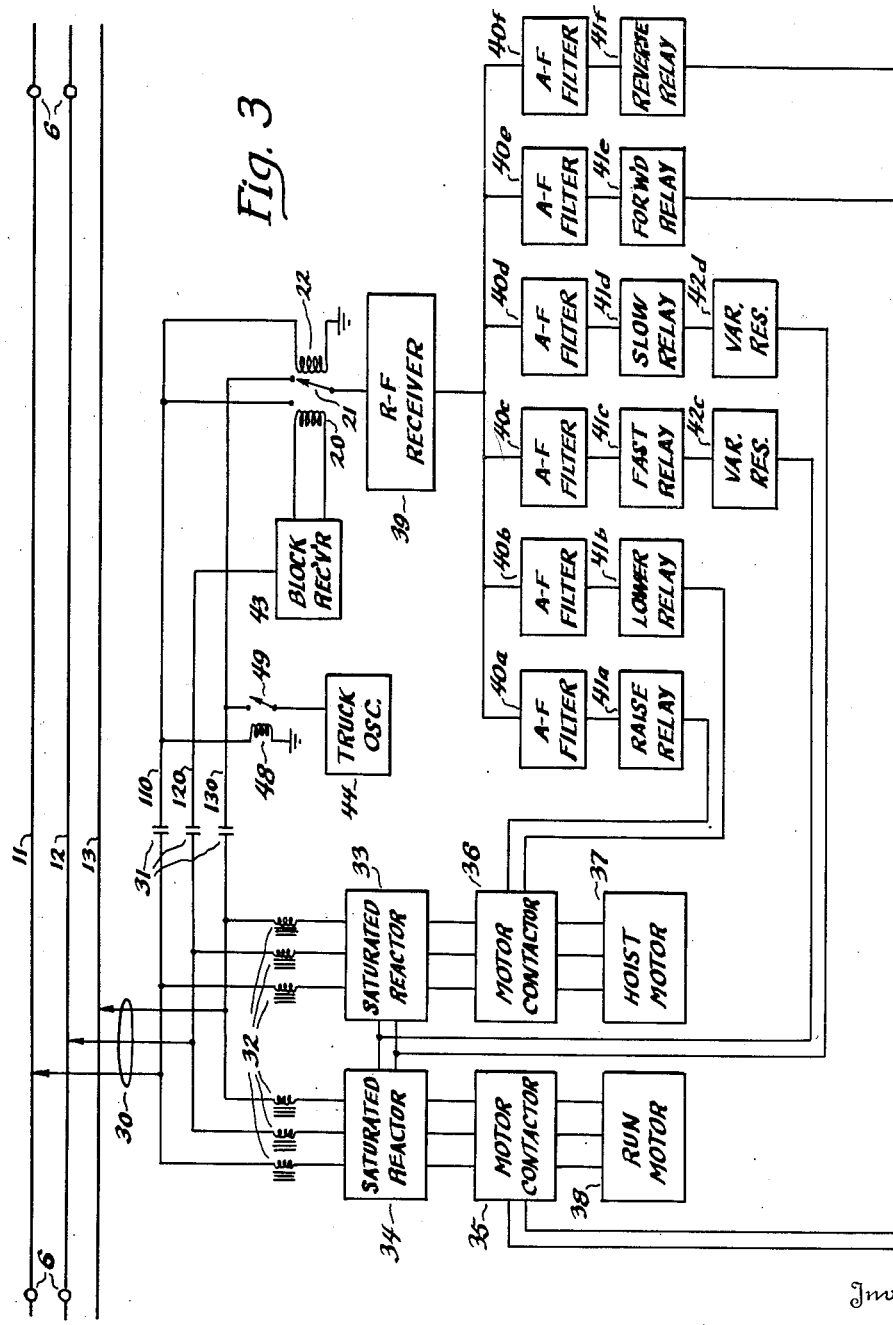
Figure 3 shows diagrammatically the component parts of the control system of the embodiment of this invention which are associated with the electric motors of a monorail cargo truck.

The component units shown in Figure 2 are each described in greater detail in the following figures:

Figure 3 is a diagrammatic representation of the drive equipment of a cargo truck and the electronic control equipment therefor. Power for the run motor and the hoist motor is obtained from trolley wires 11, 12 and 13 through trolley 30 (see Figure 8). Choke coils 32 allow the passage of power current but obstruct the passage of high-frequency control currents. Saturated reactors 33 and 34 are used to control the speed of the hoist and run motors. Motor contactors 35 and 36 connect and interrupt the current to the run and hoist motors, respectively.

Condensers 31 allow the passage of control signal voltages but prevent the passage of power voltages. When central control station 4 has control, the control signals arrive on wire 13 through the trolley to wire 130 through control switch 21 to radio-frequency receiver 39. Receiver 39 of each cargo truck is tuned to receive a different frequency. The receiver 39 is preferably provided with automatic frequency control. The demodulated output of receiver 39 is sent to audio-frequency band-pass filters 40 the outputs of which operate alternating-current relays 41. (An alternative method would be to supply the outputs from filters 40 to a rectifier or thyratron from which direct-current relays could be energized.) If the radio-frequency signal is one to which receiver 39 is tuned and the signal is modulated by an audio-frequency, which audio-frequency filter 40a will pass, raise relay 41a will close causing the operation of motor contactor 36 to actuate the hoist motor 37 in the raise direction. Audio-frequencies which will be passed by filter 40b cause the hoist motor to lower the cargo in like manner. Forward and reverse motion of the run motor 38 is likewise controlled by frequencies passed by filters 40e and 40f respectively. Frequencies passed by audio-frequency filters 40c and 40d are effective to increase and decrease, respectively, the speed of either the run or hoist motor, whichever is operating. The speed control is obtained by having relays 41c and 41d control motors which change the resistance of variable resistors 42c and 42d, respectively. Variable resistors 42c and 42d act on saturated reactors 33 and 34 to control the speed of hoist motor 37 and run motor 38, respectively.

When the cargo truck has entered a block selected by central control station 4, a signal arrives from wire 12 through trolley 30, through wire 120 to block receiver 43 which actuates relay coil 20 connecting receiver 39 to wire 110 through switch 21. When receiver 39 is thus disconnected from wire 130 and connected to wire 110, the run signal from central station 4 is removed from receiver 39 and the cargo truck automatically stops. The local control now supplies control signals through wire 11, trolley 30 and wire 110 to receiver 39. Local control generates control signals in much the same way that central control does. When local control wishes to return control to central control, a signal is sent through wire 11, trolley 30, wire 110 and relay coil 22 causing switch 21 to reconnect receiver 39 to wire 130 and 13. The same signal goes through relay coil 48 causing switch 49 to close connecting truck identification oscillator 44 to be connected to wire 130 and 13. Truck identification oscillator 44 sends a signal to the central control station indicating which cargo truck is ready to be returned. Central control then causes the cargo truck to return to the side of the ship for another load.

Figure 4:
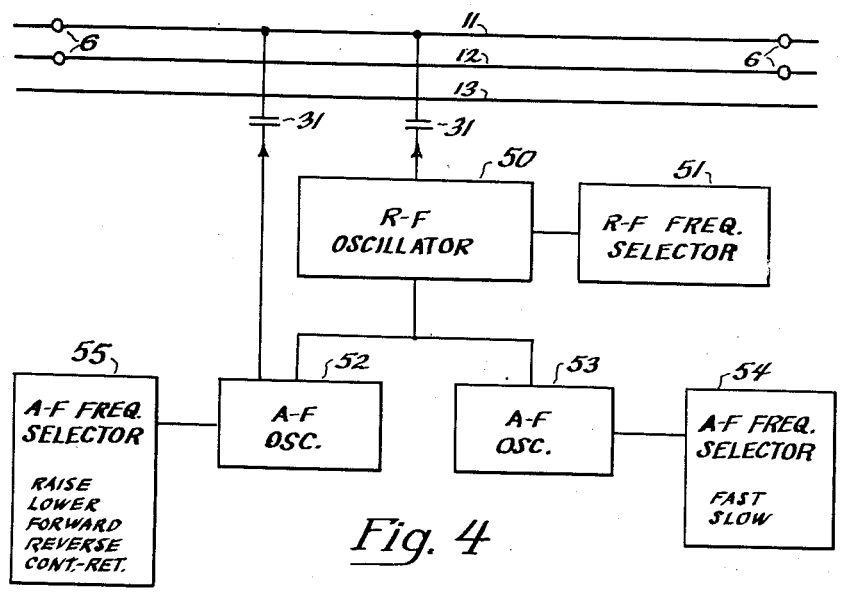
Figure 4 shows diagrammatically the component parts of the control system of the embodiment of this invention which are located at a convenient control location in a block area for local control of cargo trucks within the block.

Figure 4 is a block diagram of the control equipment for local control within a single block. The equipment is portable and designed so that it can be connected to wire 11 at any place within a block. In this way the cargo trucks may be controlled near the point on the dock where the cargo is to be deposited. Filters 6 restrain the signal from the local control apparatus within the limits of the block. Power for the control apparatus is obtained from any two of wires 11, 12 and 13. This power supply is not shown in the figure. Condensers 31 prevent the passage of power currents but allow the passage of high-frequency control signals. Radio-frequency oscillator 50 generates a signal the frequency of which is controlled by frequency selector 51. A different frequency is used to control each different cargo truck. The radio-frequency signal corresponding to a given cargo truck is modulated by various audio-frequencies corresponding to different actions of the cargo truck, such as, raise, lower, forward, reverse, fast and slow. Audio-frequency oscillators 52 and 53 modulate radio-frequency oscillator 50. Frequency selectors 55 and 54 determine the frequencies of audio-frequency oscillator 52 and audio-frequency oscillator 53, respectively. Provision is made so that an audio-frequency selected by frequency selector 55 and generated by audio-frequency oscillator 52 can be applied to wire 11 to cause the control of the cargo truck to be returned to the central control station. The audio-frequency signal thus applied to wire 11 is of such a frequency that it is not restrained by filters 6.

Figure 5 is a block diagram of the central control station. There are as many radio-frequency oscillators 60 as there are cargo trucks on the monorail system so that any combination of cargo trucks can be controlled at the same time. The outputs from radio-frequency oscillators 60 are applied to wire 13 through truck selector switches 63. Wire 13 has no isolating filters 6 so that the central control signal applied to wire 13 can pass to anywhere on the entire monorail system. Condensers 31 isolate the control equipment from the power on the line but allow the passage of control signals because of their high frequency. Audio-frequency oscillators 62 generate a different modulating frequency for each of the control functions: raise, lower, fast, slow, forward and reverse. Function selector switches 61 permit the modulation of any combination of radio-frequency oscillators 60 with any combination of audio-frequency oscillators 62. For example, if it is desired that cargo truck 1 run forward fast, the truck function selector switch is made to apply the audio frequency corresponding to forward and the audio frequency corresponding to fast to the truck 1 radio-frequency oscillator. The function selector switches are, of course, arranged so that, for example, the audio frequencies corresponding to both raise and lower cannot be applied at the same time.

The block control equipment at the central control station consists of radio-frequency oscillator 70 modulated by audio-frequency oscillator 71 at audio frequencies selected by audio-frequency selector 72. Selector 72 selects frequencies each of which corresponds to a different block. When selector 72 is set for a given block, the cargo truck on arriving at the selected block is caused to stop and the control of the cargo truck is automatically transferred from the central control station to the local control in the block.

The control indicator apparatus indicates to the central control station operator which cargo trucks he has control of. It consists of audio-frequency amplifier 80 responsive to truck identification oscillator 44 of Figure 3 when central control is in control of the truck. Audio-frequency band-pass filters 81 separate the signals from the different cargo trucks. Relays 82 receive the outputs from the filters and cause lights 83 corresponding to the various cargo trucks to light.

It is to be understood that all control equipments obtain power from the power lines by conventional means not shown.

Figure 6:
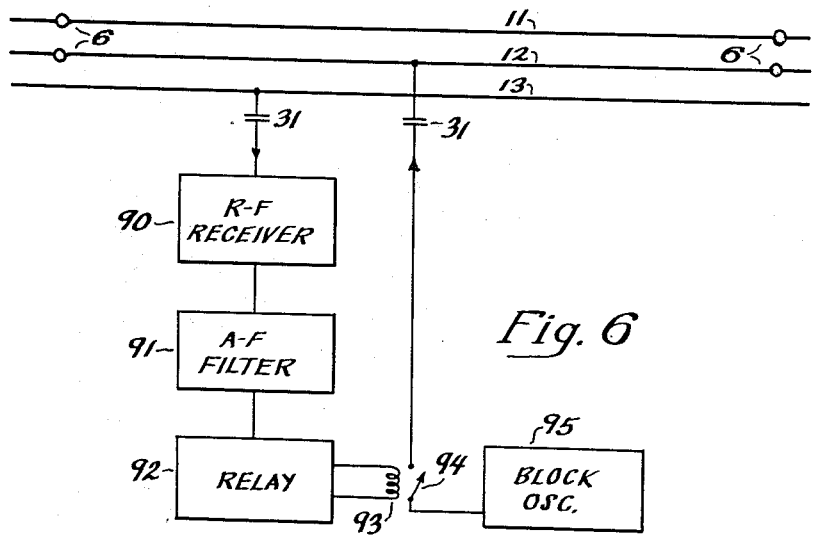
Figure 6 shows diagrammatically the component parts of the embodiment located in each block area to cause the cargo trucks to stop in the block when the block is selected as the destination of cargo trucks by the central control station.

Figure 6 is a block diagram of the block equipment permanently connected in each block. Radio-frequency receiver 90 obtains a signal from the central control station via wire 13. The audio-frequency filter 91 receives demodulated signals from receiver 90 but passes only the audio-frequencies corresponding to the particular block. The output from filter 91 operates relay 92 causing coil 93 to close switch 94 which in turn connects block oscillator 95 to wire 12. The frequency of block oscillator 95 is the same in all blocks but is such that it is restrained in the block where it is generated by filters 6 on the line 12.

Various changes and modifications can be made in the invention without departing from the spirit and scope thereof. For example, control signals can be distinguishable by being of different radio frequencies, or by being of different audio frequencies, or by being a combination of different radio frequencies and audio frequencies. It is to be understood, therefore, that the patent is not limited to the embodiment of the invention described herein or in any manner other than by the scope of the appended claims.

What is claimed is:

1. Control apparatus for a conveyor system having cargo trucks with electric hoist and run motors which obtain motive power through controllers from trolley wires, comprising in combination: means for generating and applying to the trolley line at least as many radio-frequency signals as there are cargo trucks; means for modulating said radio-frequency signals with at least as many audio-frequency signals as there are control functions desired; radio-frequency receiving means on the cargo trucks, each receiver being tuned to receive from the truck trolley a different one of said radio-frequency signals; and a plurality of audio-frequency band-pass filters and relays therefor on the cargo trucks operative to receive and separate the audio-frequency outputs from said receivers and supply corresponding actuating voltages to the cargo truck motor controllers.

2. Control apparatus for an overhead conveyor system having cargo trucks with electric hoist and run motors which obtain power from trolley wires, comprising in combination: a radio-frequency receiver on each cargo truck operative to receive and demodulate signals on the trolley wires, the receiver on each cargo truck being tuned to a different frequency; a plurality of audio-frequency band-pass filters and relays therefor on each cargo truck operative to receive and separate the output from said receiver and supply actuating voltages to the cargo truck motor controllers, each audio-frequency corresponding to a different control function; a plurality of radio-frequency oscillators connected to a trolley wire at a central control point, each oscillator being tuned to the same frequency as a cargo truck receiver; a plurality of audio-frequency oscillators each tuned to a frequency corresponding to one control function; means for causing any combination of said audio-frequency oscillators to modulate any combination of said radio-frequency oscillators; whereby the cargo trucks can be controlled independently and simultaneously from a central control point.

3. Control apparatus for a conveyor system having cargo trucks with electric hoist and run motors which obtain motive power from trolley wires, comprising in combination: at a central control point, signal generators each operative to generate a different radio-frequency, and means for connecting the output from any combination of said signal generators to the trolley line, oscillators each operative to generate a different audio-frequency modulating signal, switch means operative to allow the modulation of any combination of said signal generators by any combination of said oscillators; and on each cargo truck, a radio-frequency receiver connected to the trolley receptive to signals from one of said signal generators, a plurality of audio-frequency band-pass filters operative to receive the output from said receiver and each operative to pass the frequency of one of said oscillators, relay means operative to receive the output of each of said audio-frequency band-pass filters and supply an actuating voltage to the motor controllers; whereby each cargo truck is receptive to a different radio-frequency signal and each cargo truck action is responsive to a different audio-frequency modulation of the radio-frequency signal.

4. In a conveyor system having cargo trucks with motors which obtain motive power from trolley wires, comprising in combination: a plurality of impedances on one trolley wire operative to allow motive power to pass but operative to divide the wire into blocks from within each of which currents of certain frequencies cannot escape along the wire; a high-frequency signal generator and means for applying its output to a second wire; a receiver-transmitter in each block operative to receive a distinctive signal from said signal generator via the second wire and deliver a signal to the corresponding block of the first wire wherein the signal is entrapped; receiver means on the cargo trucks operative to receive said entrapped signals and deliver an actuating voltage to the truck motor controllers; whereby the cargo trucks can be stopped in any one of several blocks selected from a central control point.

5. In a conveyor system having cargo trucks with motors which obtain power from a trolley line, a central control station connected to one of the wires of the line and including means for generating a plurality of radio-frequency carriers and means for modulating the carriers with frequencies corresponding to different control functions, receivers on each cargo truck receptive to one of said radio-frequency carriers and operative responsively to the modulating frequencies to control the cargo truck, filters on second and third wires of the line dividing the line into blocks from which radio-frequency carriers cannot escape block equipment in each block operative through the second wire to remove the signal from said receiver, and a local control station similar to the central control station but connected to the said third wire and operative to control a cargo truck within the same block.

6. In a conveyor system having cargo trucks with motors which obtain power from trolley lines, a central control station operative to apply a plurality of modulated radio-frequency carriers to one wire of the trolley line, a receiver on each cargo truck receptive to one carrier on said wire and operative responsively to the modulation frequency to control the cargo truck, filters on a second wire of the line dividing the line into blocks from which radio frequency carriers cannot escape, a block equipment in each block connected to both of said wires of the line, and a local control station operative to apply a plurality of modulated radio-frequency carriers to a third wire, the block equipment being responsive to a signal from the central control station and operative through said second wire to make the receiver on a cargo truck in the block receptive only to signals on the said third wire.

7. Control apparatus for a conveyor system having trucks which obtain power from a trolley line comprising: a central control station operative to apply a plurality of modulated radio-frequency signals to one wire of the line, a receiver on each truck receptive to signals on the line and operative to control the truck in accordance therewith, filters on second and third wires of the line dividing the line into blocks, block equipment in each block operative through the second wire to remove the signal from said receiver and a local control station operative to apply a plurality of modulated radio-frequency signals to said third wire of the line and control a truck in the same block.

8. Control apparatus for a conveyor system having trucks which obtain power from a trolley line comprising: a control station operative to continuously supply to the line as many radio-frequency signals as there are trucks, means for modulating said radio-frequency signals with a different audio frequency for each control function desired, a receiver on each truck tuned to one of the radio frequency signals, and control means responsive to the audio output of the receiver and operative to control the corresponding function of the truck.

9. In a conveyor system having cargo trucks with motors which obtain motive power from trolley wires, comprising in combination, a plurality of impedances on one trolley wire operative to allow motive power to pass but operative to divide the wire into blocks from within each of which currents of certain frequencies cannot escape along the wire, a high-frequency signal generator and means for applying its output to a second wire, a receiver-transmitter in each block operative to receive a distinctive signal from said signal generator via the second wire and deliver a signal to the corresponding block of the first wire wherein the signal is entrapped, receiver means on the cargo trucks operative to receive said entrapped signals and deliver an actuating voltage to the truck motor controllers, whereby the cargo trucks can be stopped in any one of several blocks selected from a central control point, a high frequency signal generator in each block for applying its output through a third wire to the said cargo truck receiver after the cargo truck has been stopped.

10. Control apparatus for a conveyor system having cargo trucks with electric hoist and run motors which obtain motive power through motor controllers from trolley wires, comprising in combination, at a central control point, a signal generator operative to generate any of a plurality of different frequencies and means for connecting the output to the trolley line; at a local control point, a signal generator operative to generate any of a plurality of different frequencies, means for transferring the control from said central control point to said local control point, and on each cargo truck, a receiver connected to the trolley receptive to some of said different frequencies and operative to distinguish between the different frequencies received, relay means operative to receive the output of said receiver and control an actuating voltage to the motor controllers, whereby each action of each cargo truck is responsive to a signal of different frequency.

CHARLES E. DOUGHERTY.
EDWARD E. MINOR.

REFERENCES CITED

The following references are of record in the file of this patent:

UNITED STATES PATENTS

| Number | Name | Date |
| --- | --- | --- |
| 1,328,865 | Woodward | Jan. 27, 1920 |
| 1,417,062 | Hawkins | May 23, 1922 |
| 1,770,805 | Prince | July 15, 1930 |
| 1,786,815 | Aspinwall | Dec. 30, 1930 |
| 2,073,443 | Cardoza | Mar. 9, 1937 |
| 2,397,088 | Clay | Mar. 26, 1946 |